US011233922B2

(12) United States Patent
Shimamoto et al.

(10) Patent No.: US 11,233,922 B2
(45) Date of Patent: Jan. 25, 2022

(54) IMAGE PROCESSING DEVICE HAVING A FUNCTION OF AUTOMATICALLY DETERMINING WHETHER A DOCUMENT SHEET IS A COLOR DOCUMENT OR BLACK AND WHITE DOCUMENT

(71) Applicant: KYOCERA Document Solutions Inc., Osaka (JP)

(72) Inventors: Kunihiko Shimamoto, Osaka (JP); Ryota Kikuchi, Osaka (JP); Yasuyuki Yabuuchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/269,559

(22) PCT Filed: Jun. 28, 2019

(86) PCT No.: PCT/JP2019/025850
§ 371 (c)(1),
(2) Date: Feb. 19, 2021

(87) PCT Pub. No.: WO2020/039746
PCT Pub. Date: Feb. 27, 2020

(65) Prior Publication Data
US 2021/0337082 A1 Oct. 28, 2021

(30) Foreign Application Priority Data

Aug. 22, 2018 (JP) .............................. JP2018-155133

(51) Int. Cl.
*H04N 1/46* (2006.01)
*H04N 1/48* (2006.01)
*H04N 1/00* (2006.01)

(52) U.S. Cl.
CPC ......... *H04N 1/486* (2013.01); *H04N 1/00005* (2013.01); *H04N 1/00801* (2013.01); *H04N 1/00822* (2013.01)

(58) Field of Classification Search
CPC ............... H04N 1/486; H04N 1/00005; H04N 1/00801; H04N 1/00822
(Continued)

(56) References Cited

U.S. PATENT DOCUMENTS 5,805,970 A * 9/1998 Kasamatsu .......... G03G 15/607
358/449
5,987,163 A * 11/1999 Matsuda ............ H04N 1/00681
358/488

(Continued)

FOREIGN PATENT DOCUMENTS

JP 2005-033807 A 2/2005
JP 2010-041595 A 2/2010

*Primary Examiner* — Gabriel I Garcia
(74) *Attorney, Agent, or Firm* — Studebaker & Brackett PC

(57) ABSTRACT

An image processing device includes: an estimated size setting section (ACS determination section 151) which sets a document size of a document sheet as an estimated size; a threshold deciding section (ACS determination section 151) which decides a first threshold according to the estimated size; and an ACS determination section (151) which determines that the document sheet is a color document sheet when a number of color pixels reaches the first threshold. When an actual size of the document sheet is smaller than the estimated size, the threshold deciding section decides a second threshold which is smaller than the first threshold, and the document sheet is determined to be a color document sheet when the number of color pixels is the second threshold or greater and is determined to be a black-and-white document sheet when the number of color pixels is smaller than the second threshold.

6 Claims, 6 Drawing Sheets

(58) Field of Classification Search
USPC .......................................... 358/1.1–1.18, 514
See application file for complete search history.

(56) References Cited

U.S. PATENT DOCUMENTS

| | | | |
|---|---|---|---|
| 6,361,144 B1* | 3/2002 | Torpey | G06K 15/102 347/15 |
| 7,345,795 B2 | 3/2008 | Ando | |
| 8,411,322 B2* | 4/2013 | Kubota | H04N 1/56 358/2.1 |
| 2005/0018267 A1 | 1/2005 | Ando | |
| 2010/0296115 A1* | 11/2010 | Onishi | H04N 1/00713 358/1.9 |
| 2015/0015917 A1* | 1/2015 | Hirohata | H04N 1/00435 358/3.24 |
| 2016/0083209 A1* | 3/2016 | Kimura | H04N 1/0066 271/248 |

* cited by examiner

IMAGE PROCESSING DEVICE HAVING A FUNCTION OF AUTOMATICALLY DETERMINING WHETHER A DOCUMENT SHEET IS A COLOR DOCUMENT OR BLACK AND WHITE DOCUMENT

TECHNICAL FIELD

The present invention relates to an image processing device having a function of automatically determining whether a document sheet is a color document sheet or a black-and-white document sheet (referred to in the following as ACS determination) based on image data read from the document sheet.

BACKGROUND ART

An image processing device, such as a copier, a multifunction peripheral (MFP), or a printer, which includes an image reading section which reads image data from a document sheet has a function of performing ACS determination on image data read from a document sheet.

In general, ACS determination is a process of counting the number of color pixels included in image data and determining that a document sheet is a color document sheet when the number of color pixels reaches a preset threshold.

CITATION LIST

Patent Literature

[Patent Literature 1]
Japanese Patent Application Laid-Open Publication No. 2005-33807
[Patent Literature 2]
Japanese Patent Application Laid-Open Publication No. 2010-41595

SUMMARY OF INVENTION

Technical Problem

In the prior art, however, the threshold to which the number of color pixels is compared is a reference for determining whether a document sheet is a color document sheet or a black-and-white document sheet, and the threshold is set according to the document size to an increasingly larger value as the document size increases. Accordingly, a problem arises that the determination result of the ACS determination is erroneous when the document size of the read document sheet differs from expectation.

For example, when a plurality of document sheets is read using a document feed section having a document size-detecting function for the loaded document sheets, the document size of a read document sheet is smaller than expected in a case in which a document sheet that is short in a sub-scanning direction is mixed in with the document sheets. In this case, the document sheet that is short in the sub-scanning direction undergoes ACS determination at a large threshold and the determination reference of the ACS determination is erroneous.

The present invention takes the above problem into account, and an objective thereof is to provide an image processing device capable of performing ACS determination using a unified determination reference even in a case in which the size of a read document sheet is smaller than expected.

Solution to Problem

An image processing device according to the present invention determines whether a document sheet is a color document sheet or a black-and-white document sheet by comparing a number of color pixels in image data read from the document sheet by a document reading section to a threshold decided according to a size of the document sheet. The image processing device includes: an estimated size setting section which sets the document size of the document sheet read by the document reading section as an estimated size; a threshold deciding section which decides a first threshold according to the estimated size; and a determining section which determines that the document sheet is the color document sheet when the number of color pixels reaches the first threshold. When an actual size of the document sheet read by the document reading section is smaller than the estimated size, the threshold deciding section decides a second threshold which is smaller than the first threshold according to the actual size and the determining section determines the document sheet to be the color document sheet when the number of color pixels is the second threshold or greater and determines the document sheet to be the black-and-white document sheet when the number of color pixels is smaller than the second threshold.

Advantageous Effects of Invention

According to the present invention, ACS determination can be performed using a unified determination reference even when the document size of the read document sheet is smaller than expected.

DESCRIPTION OF EMBODIMENTS

First Embodiment

The following describes an embodiment of the present invention in detail with reference to the accompanying drawings. Note that configuration indicating the same function is labeled with the same reference signs in the following embodiment.

Figure 1:
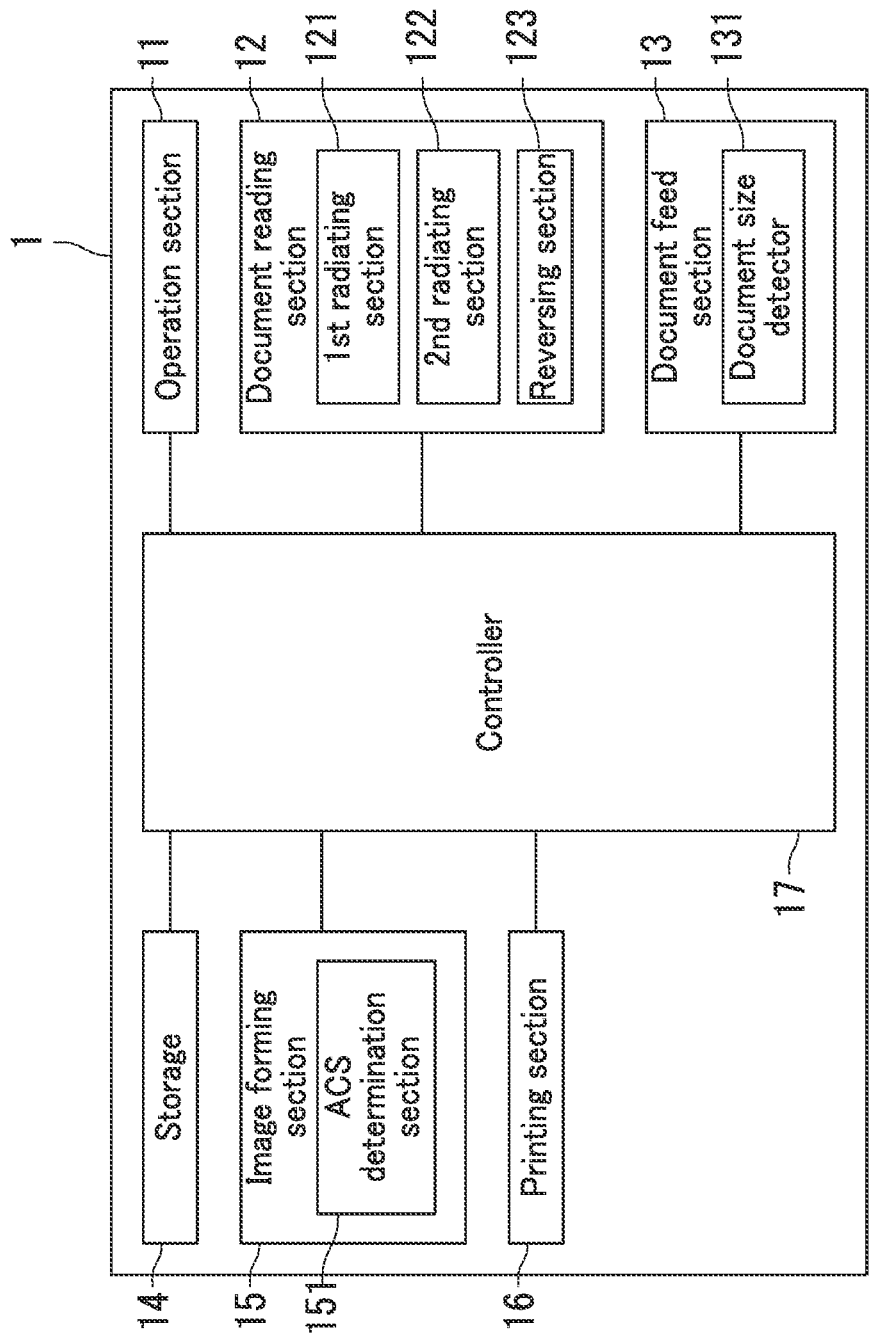
FIG. 1 is a block diagram illustrating a general configuration of an image processing device according to a first embodiment of the present invention.

An image processing device 1 according to the present embodiment is an image forming apparatus such as a copier or a multifunction peripheral/printer/product (MFP), and includes an operation section 11, a document reading section 12, a document feed section 13, storage 14, an image processing section 15, a printing section 16, and a controller 17 with reference to FIG. 1.

The image processing device 1 determines whether a document sheet is a color document sheet or a black-and-white document sheet by comparing the number of color pixels in image data read from the document sheet by the document reading section 12 to a threshold decided according to a document size.

The operation section 11 is a user interface such as a keyboard or a touch panel. The operation section 11 includes a start key which instructs performance of a document sheet reading process or a printing process, various keys which perform operations such as input of a printing setting, and a display section which displays items such as setting values or error detail content. The operation section 11 also includes an audio output section such as a speaker.

The document reading section 12 is a color scanner which radiates light to the document sheet and receives reflected light or the like to read the document sheet as RGB image data. The document reading section 12 includes contact glass on which the document sheet is placed, slit glass provided on a conveyance path of the document feed section 13, a radiating section which radiates light to the document sheet, a photoelectric conversion element in which a plurality of image sensors are arranged in a main scanning direction, and a reading unit which includes optical components such as a lens.

The document feed section 13 feeds a document sheet placed on a document sheet loading surface thereof on a sheet-by-sheet basis in order to the document reading section 12. The document feed section 13 also includes a document size detector 131 which detects the document size of the document sheet placed on the document sheet loading surface.

The operation section 11 instructs reading of the document sheet in the state in which the document sheet is placed on the document sheet loading surface of the document feed section 13. The document reading section 12 reads the document sheet fed by the document feed section 13. In this case, the document reading section 12 moves the reading unit to a position opposite to the slit glass and reads the document sheet through the slit glass during a feeding operation by the document feed section 13 to acquire image data.

The storage 14 is a storage means such as semiconductor memory or a hard disk drive (HDD) in which items such as the image data read by the document reading section 12 are accumulated.

The image processing section 15 is an arithmetic processing circuit such as a microcomputer including elements such as a central processing unit (CPU), read-only memory (ROM), and random-access memory (RAM). The image processing section 15 performs various jobs according to image processing such as enlargement and reduction processing, density adjustment processing, and gray scale adjustment processing.

The image processing section 15 also functions as an ACS determination section 151 which automatically determines whether the document sheet is a color document sheet or a black-and-white document sheet based on the image data read from the document sheet. The ACS determination section 151 determines that the document sheet is a color document sheet when the number of color pixels reaches a first threshold. When the ACS determination section 151 determines that the document sheet is a color document sheet, the image processing section 15 performs, as color image processing, processing such as color space conversion processing to convert RGB image data to CMY image data and optionally black generation processing to generate black from CMY image data. When the ACS determination section 151 determines that the document sheet is a black-and-white document sheet, the image processing section 15 performs black-and-white image processing to generate black-and-white image data from RGB image data.

The printing section 16 includes four image forming sections and an intermediate transfer belt provided adjacent to the four image forming sections. The image forming sections correspond to respective image data of four different colors: C (cyan), M (magenta), Y (yellow), and K (black). In the printing section 16, toner images of the four colors formed by the four respective image forming sections are sequentially transferred to the intermediate transfer belt and then transferred together to a recording medium.

The controller 17 is an arithmetic processing circuit such as a microcomputer including elements such as a central processing unit (CPU), read-only memory (ROM), and random-access memory (RAM). A control program for performing operation control of the image processing device 1 is stored in the ROM. The controller 17 performs control of the entire device by reading out the control program stored in the ROM and loading the control program in the RAM.

Next, an ACS determination operation performed by the ACS determination section 151 is described in detail with reference to FIGS. 2A, 2B, 3A, and 3B. In the following description, it is assumed that the image processing device 1 is set to a mode in which the ACS determination section 151 performs ACS determination.

Figure 2A:
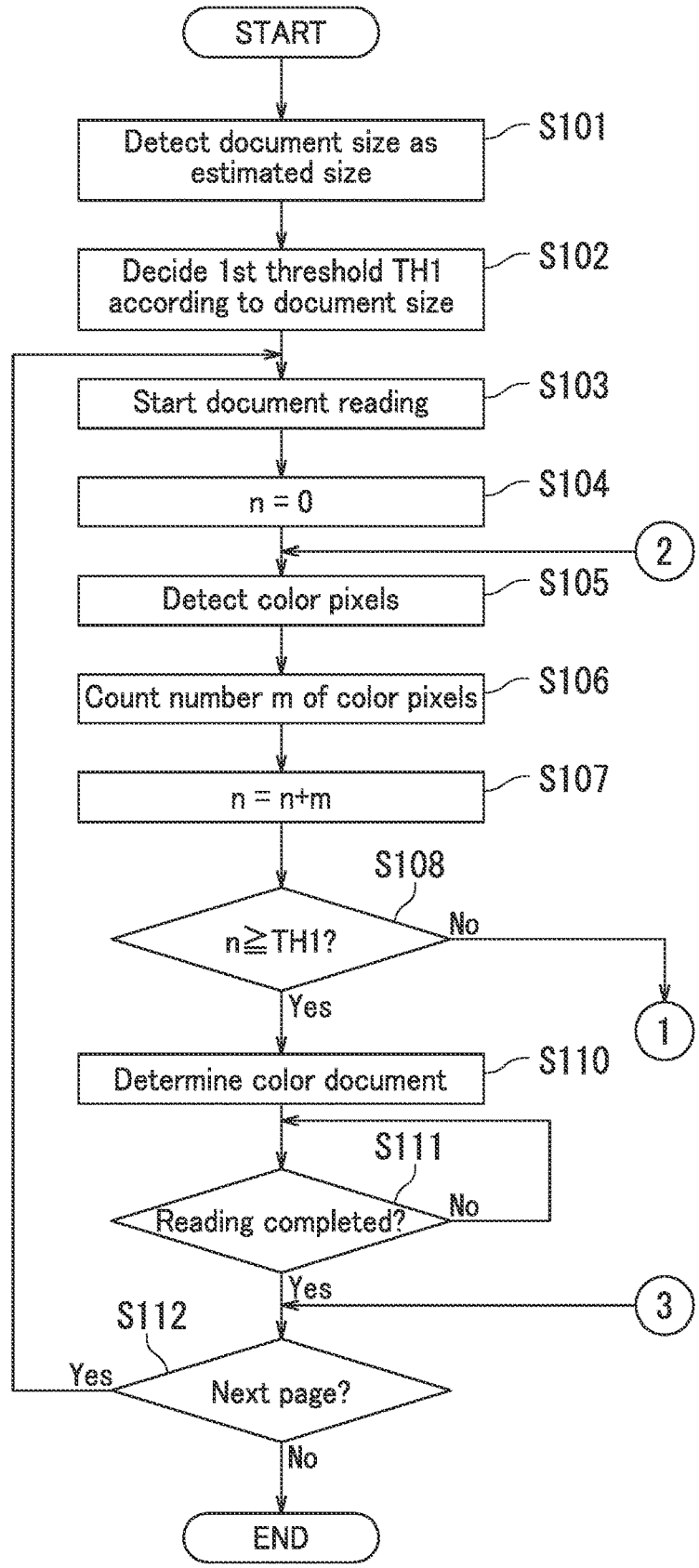
FIG. 2A is a flowchart depicting an ACS determination operation of an ACS determination section illustrated in FIG. 1 in the first embodiment.

As illustrated in FIG. 2A, upon the operation section 11 instructing reading of a document sheet in a state in which the document sheet is placed on the document sheet loading surface of the document feed section 13, the ACS determination section 151 functions as an estimated size setting section and sets the document size detected by the document size detector 131 as an estimated size (Step S101). Note that in Step S101, a user may set the estimated size using the operation section 11. In this case, the operation section 11 functions as the estimated size setting section.

Next, the ACS determination section 151 functions as a threshold deciding section and decides a first threshold TH1 according to the estimated size. That is, the threshold deciding section decides, as the first threshold TH1, a threshold to be used in the ACS determination according to the estimated size detected in Step S101 (Step S102). The threshold is set to a larger value as the document size increases.

Next, the document reading section 12 starts reading the document sheet fed by the document feed section 13 (Step S103).

After setting a variable n to "0" (Step S104), the ACS determination section 151 functions as a color pixel detector and detects color pixels from the image data read by the document reading section 12 (Step S105). Note that color pixel detection may be performed at each line, at each plurality of lines (number of lines×number of pixels of a line), or at each pixel.

Next, the ACS determination section 151 functions as a color pixel counting section, counts a number m of detected pixels detected in Step S105 (Step S106), and adds the number m to the variable n (Step S107). The ACS determination section 151 then judges whether or not the variable n (n=n+m) is the first threshold TH1 or greater (Step S108).

Figure 2B:
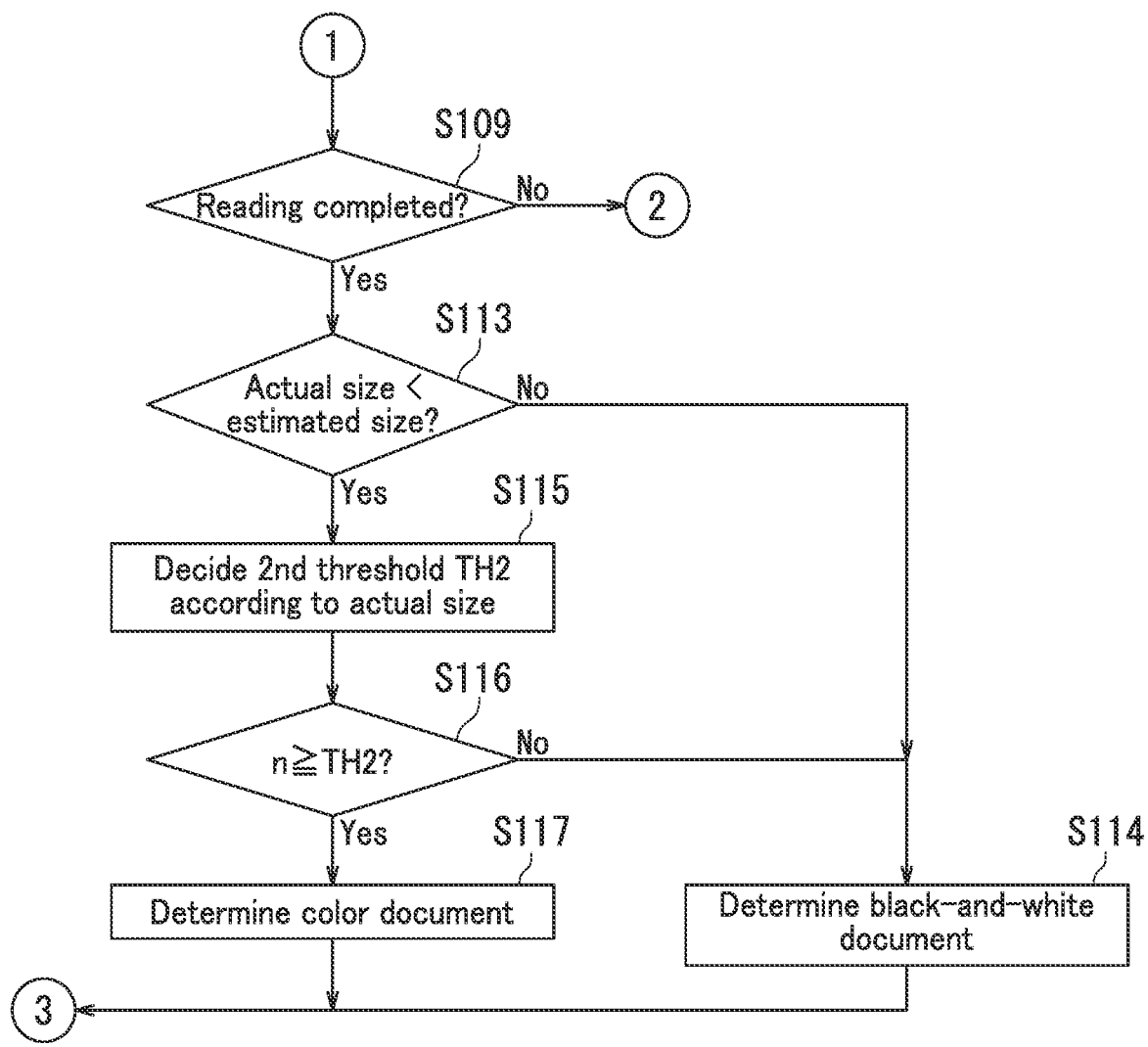
FIG. 2B is a flowchart depicting the ACS determination operation of the ACS determination section illustrated in FIG. 1 in the first embodiment.

As depicted in FIG. 2B, the document reading section 12 judges whether or not reading of the document sheet has completed (Step S109). When No in both Step S108 and Step S109, the process returns to Step S105 as depicted in FIG. 2A and the ACS determination section 151 detects color pixels from the image data. Therefore, the number of detected color pixels is integrated as the variable n (n=n+m).

Figure 3A:
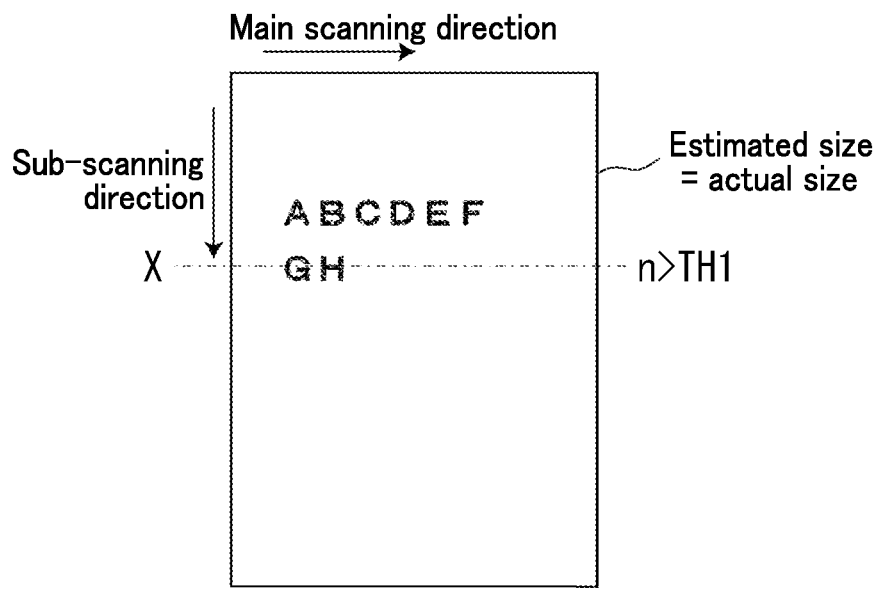
FIG. 3A is a descriptive diagram illustrating the ACS determination operation of the ACS determination section illustrated in FIG. 1.

When the variable n is the first threshold TH1 or greater in Step S108 depicted in FIG. 2A, the ACS determination section 151 determines the document sheet to be a color document sheet (Step S110). When the variable n reaches the first threshold TH1 at line X as illustrated in FIG. 3A, the document sheet is determined to be a color document sheet even if reading is incomplete.

Therefore, color image processing or recording paper feeding can be started at a timing at which the document sheet is determined to be a color document sheet during reading and thus performance can be improved. Note that in FIG. 3A, "A to H" represent a character string printed in color.

Next, as depicted in FIG. 2A, the document reading section 12 waits for the reading of the document sheet to be completed (Step S111) and judges whether or not there is a next document sheet when the reading of the document sheet is completed (Step S112).

When there is no next document sheet in Step S112, the document reading section 12 ends the reading operation and the ACS determination section 151 ends the ACS determination operation. When there is a next document sheet in Step S112, the document reading section 12 returns to Step S103 and begins reading the document sheet.

When, as depicted in FIG. 2A, the variable n is smaller than the first threshold TH1 in Step S108 but the reading of the document sheet is completed in Step S109, the ACS determination section 151 judges whether or not the actual size of the document sheet read by the document reading section 12 is smaller than the estimated size (Step S113).

Figure 3B:
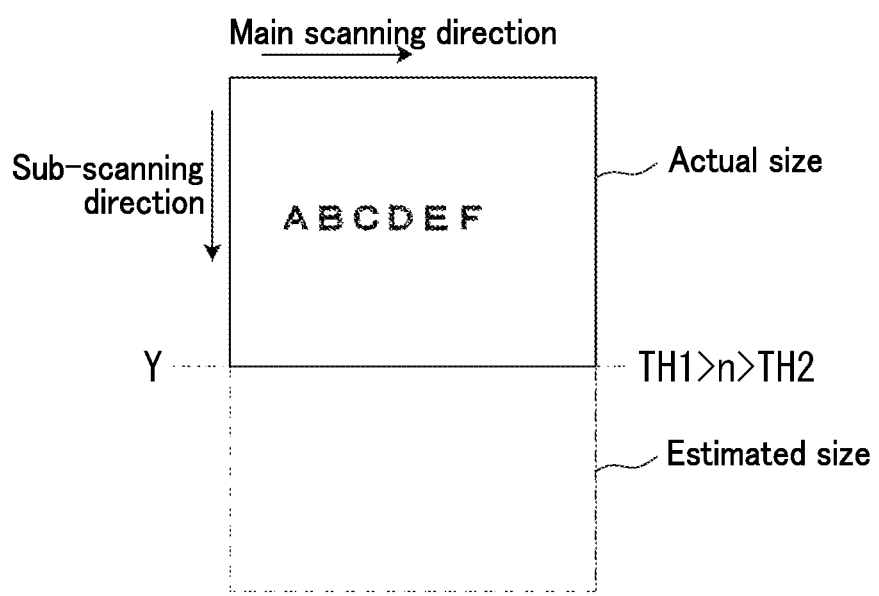
FIG. 3B is a descriptive diagram illustrating the ACS determination operation of the ACS determination section illustrated in FIG. 1.

As depicted in FIG. 3B, when the actual size of the document sheet read by the document reading section 12 is the estimated size or greater in Step S113, the ACS determination section 151 determines the document sheet to be a black-and-white document sheet (Step S114) and the process advances to Step S112.

When the actual size of the document sheet read by the document reading section 12 is smaller than the estimated size in Step S113, the ACS determination section 151 (deciding section) decides the threshold to be used in the ACS determination to be a second threshold TH2 according to the actual size (Step S115). The ACS determination section 151 then judges whether or not the variable n is the second threshold TH2 or greater (Step S116). Note that the second threshold TH2 decided according to the actual size is a smaller value than the first threshold TH1 decided according to the estimated size because the actual size is smaller than the estimated size.

When the variable n exceeds the second threshold TH2 in Step S116, the ACS determination section 151 (deciding section) determines that the document sheet is a color document sheet (Step S117), and the process advances to Step S112. As illustrated in FIG. 3B, the document sheet is determined to be a color document sheet when the variable n reaches the second threshold TH2 decided according to the actual size even if the variable n is smaller than the first threshold TH1 at a line Y at which reading of the document sheet is completed.

When the variable n is smaller than the second threshold TH2 in Step S116, the ACS determination section 151 (deciding section) advances to Step S114 and determines the document sheet to be a black-and-white document sheet.

According to the present embodiment as described above, the image processing device 1 determines whether a document sheet is a color document sheet or a black-and-white document sheet by comparing a number of color pixels (variable n) in image data read from the document sheet by the document reading section 12 to a threshold decided according to the size of the document sheet. The image processing device 1 includes: an estimated size setting section (ACS determination section 151) which sets a document size of the document sheet read by the document reading section 12 as an estimated size; a threshold deciding section (ACS determination section 151) which decides a first threshold TH1 according to the estimated size; and an ACS determination section 151 which determines that the document sheet is a color document sheet when the number of color pixels (variable n) reaches the first threshold TH1. When the actual size of the document sheet read by the document reading section 12 is smaller than the estimated size, the threshold deciding section decides a second threshold TH2 which is smaller than the first threshold TH1 according to the actual size, determines the document sheet to be a color document sheet when the number of color pixels (variable n) is the second threshold TH2 or greater, and determines the document sheet to be a black-and-white document sheet when the number of color pixels (variable n) is smaller than the second threshold TH2.

With this configuration, ACS determination can be performed using a unified determination reference even when the document size of the read document sheet is smaller than expected.

Also in the present embodiment, the image processing section 15 starts color image processing when the number of color pixels (variable n) reaches the first threshold TH1.

According to the present embodiment, color image processing can be started at a timing at which the document sheet is determined to be a color document sheet during reading and performance can be improved.

Second Embodiment

Next, a second embodiment is described with reference to FIGS. 4 and 5 in addition to FIG. 1. In the second embodiment, black-and-white image areas and color image areas are distinguished in the document sheet and image processing based on the image processing described in the first embodiment is appropriately performed on each image area. The image processing described in the first embodiment may be applied to image processing not described in the second embodiment.

In the first embodiment, each document sheet is distinguished as a color document sheet or a black-and-white document sheet. In the second embodiment, a document sheet is divided into a plurality of areas and each area is distinguished as an area with a color image printed therein or an area with a black-and-white image printed therein.

For example, a case is considered in which an A4-sized document sheet is read of which a sentence is printed in black and white with a color line marker drawn in only the center thereof. In this case, color image processing may be performed on only the area with the line marker drawn therein, and black-and-white image processing may be performed in other areas.

In the second embodiment, A4 size is assumed as an example of the estimated size of the document sheet and 15 million pixels is assumed as an example of the total number of pixels in A4 size. As an example, an A4-sized document sheet includes areas classified into any of three areas: a first area with 1 pixel to 5 million pixels, a second area from 5,000,001 pixels 10 million pixels, and a third area with 10,000,001 pixels to 15 million pixels.

Furthermore, a sheaf of document sheets with an estimated size of A4 size is placed on the document feed section 13, and a document sheet with an actual size of A5 size as an example is mixed therein (Step S120). An example of the total number of pixels in A5 size is 7.5 million pixels. As an example, the A5-sized document sheet includes area classified into any of three areas: a fourth area with 1 pixel to 2.5 million pixels, a fifth area with 2,500,001 pixels to 5 million pixels, and a sixth area with 5,000,001 pixels to 7.5 million pixels.

Upon the operation section 11 instructing reading of a document sheet in a state in which the document sheet is placed on the document sheet loading surface of the document feed section 13, the ACS determination section 151 functions as an estimated size setting section and sets the document size detected by the document size detector 131 as the estimated size (Step S121). Note that in Step S121, the user may set the estimated size using the operation section 11. In this case, the operation section 11 functions as the estimated size setting section.

Next, the ACS determination section 151 functions as a threshold deciding section and decides a third threshold TH3 according to the estimated size. That is, the ACS determination section 151 decides the threshold to be used in the ACS determination as the third threshold TH3 according to the estimated size detected in Step S121 (Step S122). The threshold is set to a larger value as the document size increases.

Next, the document reading section 12 starts reading the first area of the document sheet fed by the document feed section 13 (Step S123).

After setting the variable n to "0" (Step S124), the ACS determination section 151 functions as a color pixel detector and detects color pixels from the image data of the first area read by the document reading section 12 (Step S125). Note that color pixel detection may be performed at each line, at each plurality of lines (number of lines×number of pixels of a line), or at each pixel.

Next, the ACS determination section 151 functions as a color pixel counting section, counts the number m of detected pixels detected in Step S125 (Step S126), and adds the number m to the variable n (Step S127). The ACS determination section 151 then judges whether or not the variable n (n=n+m) is the third threshold TH3 or greater (Step S128). When the ACS determination section 151 judges that the variable n (n=n+m) is smaller than the third threshold TH3 (No in Step S128), the document reading section 12 judges whether or not reading of the first area has been completed as illustrated in FIG. 5 (Step S129).

When No in both Step S128 and Step S129, the process returns to Step S125 and the ACS determination section 151 continues to detect color pixels from the image data. Therefore, the number of detected color pixels is integrated as the variable n (n=n+m).

When the variable n reaches the third threshold TH3 in Step S128 (Yes in Step S128), the ACS determination section 151 determines that a color image is printed in the first area (Step S130). When the variable n reaches the third threshold TH3 at a line X as illustrated in FIG. 3A, the first area is determined to be a color image even if reading is incomplete. Therefore, color image processing or recording paper feeding can be started at a timing at which the first area is determined to be a color image during reading and performance can be improved.

Next, the document reading section 12 waits for reading of the image of the first area to be completed (Step S131) and judges whether or not there is a next area when the reading of the image of the first area is completed (Step S132).

When there is no next area in Step S132 (No in Step S132), the document reading section 12 ends the reading operation and the ACS determination section 151 ends the ACS determination operation. When there is a next area (second area) in Step S132 (Yes in Step S132), the document reading section 12 returns to Step S123 and starts reading the next area.

When there is no next area (second area) in Step S132 (No in Step S132), the process ends.

When the variable n does not reach the third threshold TH3 in Step S128 and the reading of the first area is completed in Step S129, the ACS determination section 151 determines whether or not the number of pixels in the next area read by the document reading section 12 is a prescribed number or greater (Step S133).

When the number of pixels read by the document reading section 12 is the prescribed number or greater (Yes in Step S133), the ACS determination section 151 determines that the next area is a first area in the document sheet for which the actual size is A4 size (Step S134).

The ACS determination section 151 determines that the first area is a black-and-white image because the variable n is smaller than the third threshold TH3 for the A4-sized document sheet (Step S135). Thereafter, the ACS determination section 151 performs the process of Step S132 depicted in FIG. 4.

Figure 4:
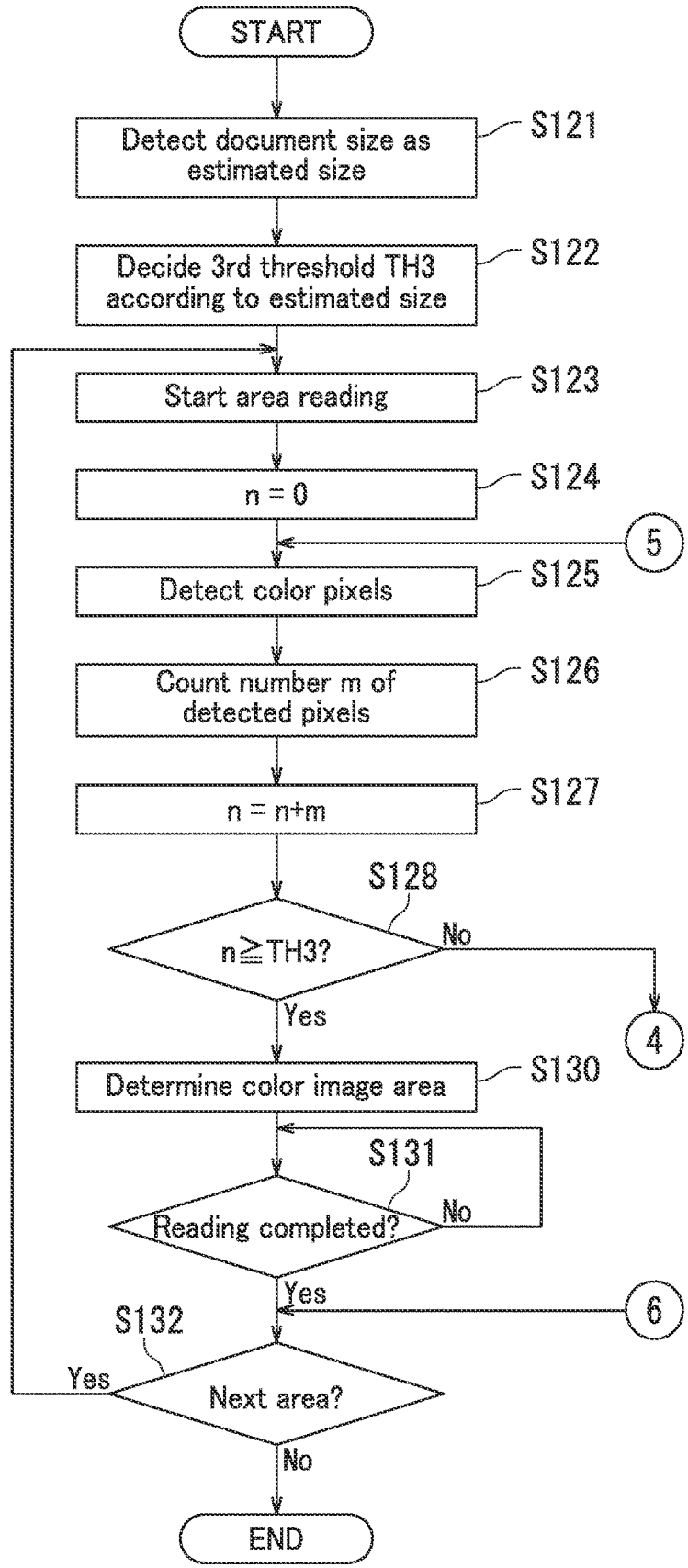
FIG. 4 is a flowchart depicting an ACS determination operation of the ACS determination section illustrated in FIG. 1 according to a second embodiment.
Figure 5:
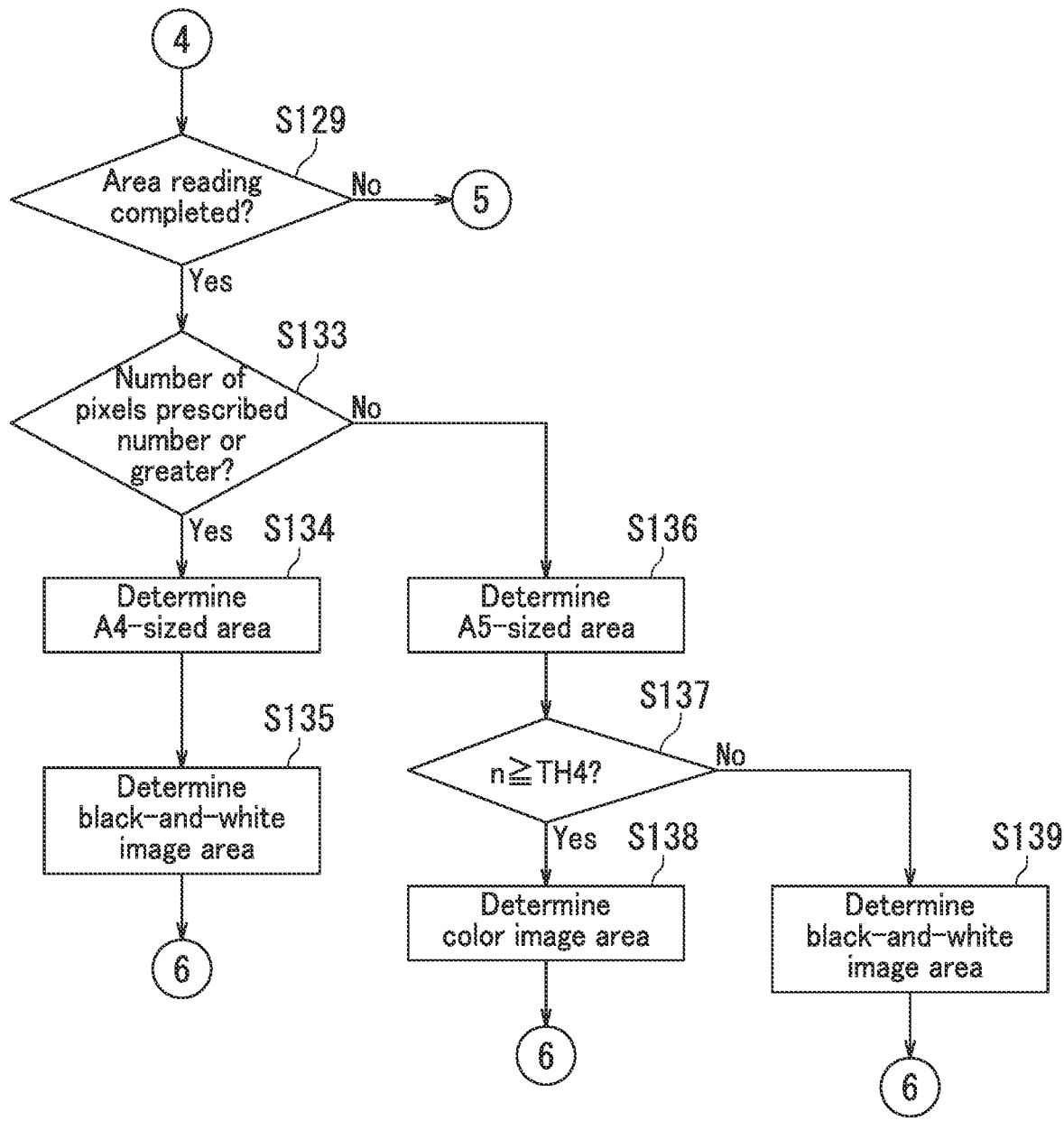
FIG. 5 is a flowchart depicting the ACS determination operation of the ACS determination section illustrated in FIG. 1 in the second embodiment.

When it is determined that the reading of the first area has not been completed in Step S129 (No in Step S129), the process returns to Step S125 illustrated in FIG. 4 and detection of color pixels continues.

When the number of pixels in the next area read by the document reading section 12 is smaller than the prescribed number in Step S133 (No in Step S133), the ACS determination section 151 determines for example that the next area is a fourth area in the document sheet for which the actual size is A5 size (Step S136).

When the variable n reaches a fourth threshold TH4 in Step S137, the ACS determination section 151 determines that the fourth area of the A5 document sheet is a color image (Step S138) and the process advances to Step S132 in FIG. 4. In this case, the fourth area is determined to be a color image when the variable n reaches the fourth threshold TH4 decided according to the actual size even if the variable n is smaller than the third threshold TH3 at the line Y at which reading of the fourth area is completed.

When the variable n is smaller than the fourth threshold TH4 in Step S137 (No in Step S137), the ACS determination section 151 advances to Step S139 and determines the fourth area to be a black-and-white image. The process then advances to Step S132 depicted in FIG. 4 and image processing is performed on the fifth and subsequent areas.

According to the present embodiment as described above, the image processing device 1 divides a document sheet into a plurality of areas and determines whether each of the areas is a color image or a black-and-white image by comparing the number of color pixels (variable n) in image data read from the document sheet by the document reading section 12 for the area to a threshold decided according to the size of the document sheet.

The estimated size setting section (ACS determination section 151) sets a document size of the document sheet read by the document reading section 12 as an estimated size. A threshold deciding section (ACS determination section 151) decides a third threshold TH3 according to the estimated size. The ACS determination section 151 determines that the area of the document sheet is a color image when the number of color pixels (variable n) in the area reaches the third threshold TH3.

When the actual size (A5 size) of the document sheet read by the document reading section 12 is smaller than the estimated size (A4 size) of the document sheet, the threshold deciding section decides a fourth threshold TH4 which is smaller than the third threshold TH3 according to the number of pixels in each of the areas into which the document sheet of the actual size is divided, determines the area to be a color image when the number of color pixels (variable n) in the area is the fourth threshold TH4 or greater, and determines the area to be a black-and-white image when the number of color pixels (variable n) in the area is smaller than the fourth threshold TH4.

With this configuration, ACS determination can be performed using a unified determination reference even when the document size of the read document sheet is smaller than expected.

Furthermore, color image processing can be started at a timing at which an area is determined to be a color image during reading of the area even if the document sheet has a layout that is divided into a color image area and a black-and-white image area, and performance can be further improved.

Third Embodiment

Next, a third embodiment is described with reference to FIGS. 1 to 5. In the third embodiment, images being formed on both sides of a document sheet is detected, each side of the document sheet is divided into a black-and-white image area and a color image area, and the image processing is appropriately performed on each area based on the image processing described in the first and second embodiments.

Because color image processing and black-and-white image processing are performed as described in the first and second embodiments, duplicate description is omitted.

The document reading section 12 may include a first radiating section 121 which radiates light to an obverse side of the document sheet and a second radiating section 122 which radiates light to a reverse side of the document sheet. Respective images of both sides of the document sheet fed by the document feed section 13 are read using the first and second radiating sections 121 and 122, and image data of the respective sides is stored in the storage 14. Afterward, the image processing of the first and second embodiments is applied.

Alternatively, the document reading section 12 may have the same configuration as in the first embodiment, and the document feed section 13 may include a reversing section 123 which reverses the obverse and reverse sides of the document sheet.

In this case, the obverse and reverse sides of the document sheet fed by the document feed section 13 are reversed by the reversing section 123 after the document reading section 12 reads an image of the obverse side. After the document reading section 12 reads the reverse side of the document sheet, image data of the respective sides is stored in the storage 14.

The ACS determination section 151 compares the number m of detected pixels to the first and second thresholds TH1 and TH2 for each of the obverse and reverse sides of the document sheet to determine whether the side is a color image or a black-and-white image. The ACS determination section 151 compares the number m of detected pixels to the third and fourth thresholds TH3 and TH4 for each area of the obverse side of the document sheet to determine whether the area is a color image or a black-and-white image. The ACS determination section 151 compares the number m of detected pixels to the third and fourth thresholds TH3 and TH4 for each area of the reverse side of the document sheet to determine whether the area is a color image or a black-and-white image. Afterward, the image processing of the first and second embodiments is applied.

According to the present embodiment, even if an A5 document sheet is mixed in with a sheaf of A4 document sheets including a document sheet with printing on both sides thereof and a color image area and a black-and-white image area are mixed in the respective document sheets, the color image area and the black-and-white image area can be distinguished in each document sheet based on the size of the document sheet and image processing can be favorably performed according to the areas.

Note that the present invention is not limited to the above embodiments, and it is evident that the embodiments may be appropriately altered within a scope of the technical concept of the present invention. Furthermore, aspects such as number, position, and shape of the above constituent members are not limited to those in the above embodiments, and may be any number, position, shape, or the like to preferably implement the present invention. Note that the same constituent elements are labeled with the same reference signs in the accompanying drawings.

The invention claimed is:

1. An image processing device which determines whether a document sheet is a color document sheet or a black-and-white document sheet by comparing a number of color pixels in image data read from the document sheet by a document reading section to a threshold decided according to a size of the document sheet, the image processing device comprising:
   an estimated size setting section configured to set a document size of the document sheet read by the document reading section as an estimated size;
   a threshold deciding section configured to decide a first threshold according to the estimated size; and
   a determining section configured to determine that the document sheet is the color document sheet when the number of color pixels reaches the first threshold, wherein
   when an actual size of the document sheet read by the document reading section is smaller than the estimated size, the threshold deciding section decides a second threshold which is smaller than the first threshold according to the actual size and the determining section determines the document sheet to be the color document sheet when the number of color pixels is the second threshold or greater and determines the document sheet to be the black-and-white document sheet when the number of color pixels is smaller than the second threshold.

2. The image processing device according to claim 1, further comprising a processor configured to start color image processing when the number of color pixels has reached the first threshold.

3. The image processing device according to claim 1, wherein the document reading section includes a first radiating section which radiates light to an obverse side of the document sheet and a second radiating section which radiates light to a reverse side of the document sheet.

4. The image processing device according to claim 1, further comprising a document feed section which feeds the document sheet to the document reading section, wherein the document feed section includes a reversing section which reverses obverse and reverse sides of the document sheet.

5. An image processing device which divides a document sheet into a plurality of areas and determines whether each of the areas is a color image or a black-and-white image by comparing a number of color pixels in image data read from the document sheet by a document reading section for the area to a threshold decided according to a size of the document sheet, the image processing device comprising:

an estimated size setting section configured to set a document size of the document sheet read by the document reading section as an estimated size;

a threshold deciding section configured to decide a third threshold according to the estimated size; and an ACS determination section configured to determine that the area of the document sheet is the color image when the number of color pixels in the area reaches the third threshold, wherein when an actual size of the document sheet read by the document reading section is smaller than the estimated size, the threshold deciding section decides a fourth threshold which is smaller than the third threshold according to a number of pixels in each of the areas into which the document sheet of the actual size is divided, determines the area to be the color image when the number of color pixels in the area is the fourth threshold or greater, and determines the area to be a black-and-white image when the number of color pixels in the area is smaller than the fourth threshold.

6. The image processing device according to claim 5, further comprising a processor configured to start color image processing when the number of color pixels has reached the third threshold.

\* \* \* \* \*